Nov. 5, 1957    V. TENO    2,811,961
COMPOSITE GRIND WHEEL FORMING TOOL
Filed Nov. 9, 1953
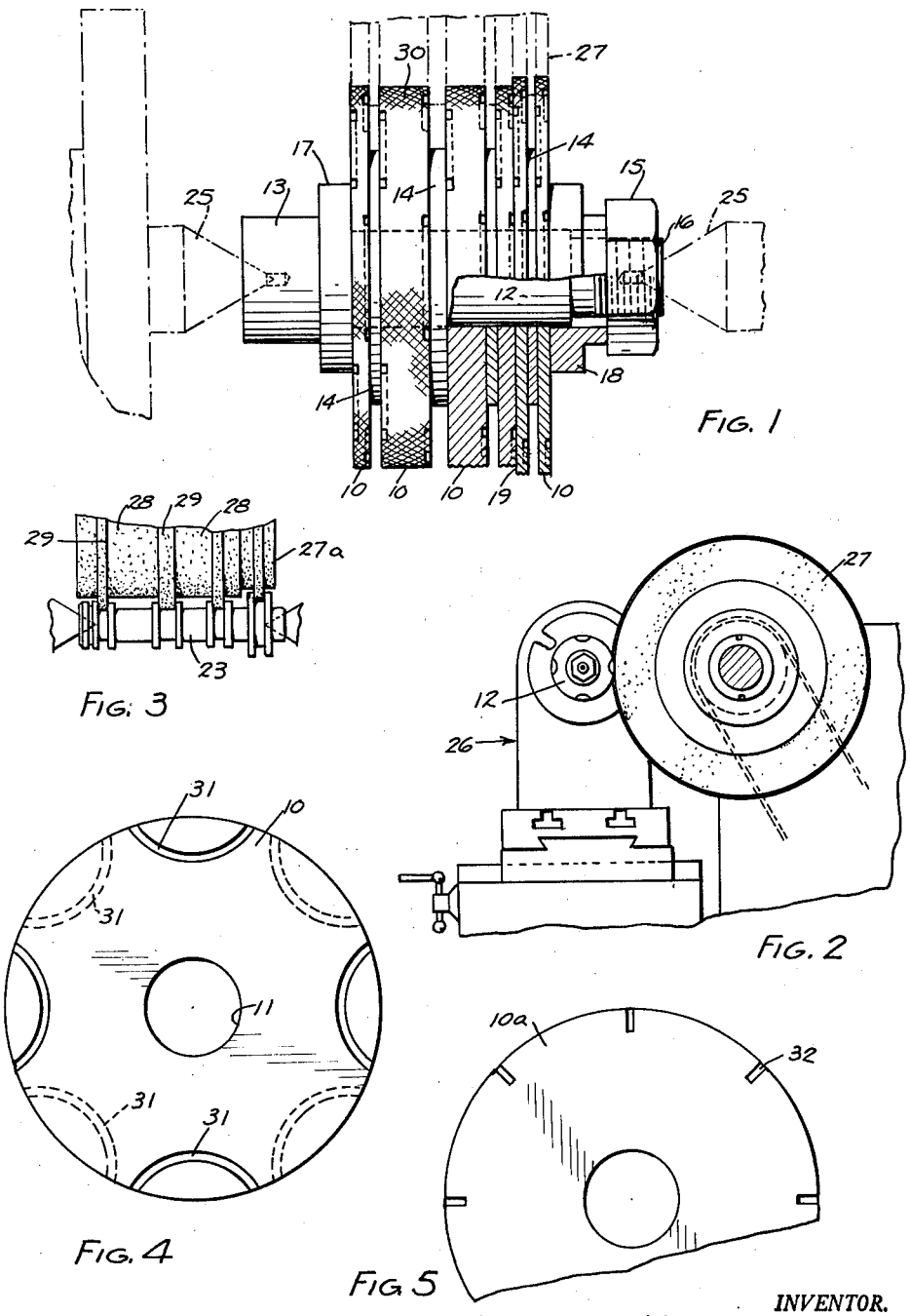
INVENTOR.
VINCENT TENO
BY
ATTORNEYS.

United States Patent Office 2,811,961
Patented Nov. 5, 1957

2,811,961

COMPOSITE GRIND WHEEL FORMING TOOL

Vincent Teno, East Detroit, Mich.

Application November 9, 1953, Serial No. 390,797

5 Claims. (Cl. 125—37)

This invention relates to a composite tool for simultaneously forming a plurality of selectively spaced and dimensioned grooves in a grind wheel.

An exemplary application of the invention lies in the forming of grind wheels for grinding multiple recesses or grooves in hardened steel articles produced in large volume. The grind wheels used in such production are often specially formed to cut the multiple grooves in a single operation and tools must be specially provided for properly forming such grind wheels. A manufacturer may make a number of articles of different shapes and the shape of the articles may be changed from time to time so that numerous tools for shaping grind wheels must be provided.

It is an object of this invention to provide a simple, inexpensive device which will obviate the costly necessity of making a special separate grind wheel forming tool for each type of article manufactured, and each change therein.

The invention generally contemplates the use of a number of crushers and spacers of various dimensions selectively and removably mountable on an arbor to build up a tool to be used for a particular grind wheel forming job and then dismantled. One embodiment of the invention is shown in the accompanying drawings, of which the following is a brief description.

Fig. 1 is generally a side elevation showing the device of this invention with its parts in assembled relation and showing a grind wheel in broken lines.

Fig. 2 is an end view showing the device in use.

Fig. 3 illustrates the use of a grind wheel formed by the device of this invention.

Fig. 4 is a view of a crusher separated from the other parts and showing waste disposal recesses therein.

Fig. 5 shows a modified form of the crusher.

The device shown in the drawings has a number of circular disc shaped crushers 10 of various widths and diameters (Fig. 1), each having a centrally located opening 11 for nicely engaging the shaft 12 of an arbor 13. A number of spacers 14 of various widths are provided for spacing the crushers apart and the spacers are also centrally apertured to nicely engage the shaft 12.

The crushers and spacers are assembled on the arbor 13 by passing the shaft 12 through the central openings therein. The parts are non-rotatably secured together by such means as a nut 15 threaded onto one end 16 of the arbor shaft to clamp the crushers and spacers between an enlargement 17 on the arbor and a washer member 18.

A tool for forming a grind wheel for a desired multiple groove grinding operation is provided by assembling crushers of proper widths and diameters on the arbor with spacers of proper widths interposed at the proper locations. Where desired, crushers may be mounted adjacent one another with no interposed spacer as shown at 19 (Fig. 1). With the parts properly secured together as described the tool is mounted between the centers 25 of a grinding machine 26, the ends of the arbor 13 being recessed for this purpose (Fig. 1).

The grind wheel 27 is shaped by holding it forcibly against the crushers 10 and rotating it (Fig. 2), so that the crushers and the grindstone roll on each other. The spacers are of relatively small diameter so that they do not contact the grind wheel. The surfaces of the crushers, by a crushing action, gradually form grooves 28 of the desired width, depth and spacing in the grind wheels and lands 29 are left between the grooves (Fig. 3). The crushing surfaces may be provided with relatively small protuberances as indicated at 30 to increase the crushing action. The protuberances are conveniently provided by knurling.

The crushing operation produces waste in the form of small particles broken away from the grind wheel. Each crusher 10 is provided with recesses (Figs. 4 and 5) for disposing of this waste, especially where the groove in the grind wheel has reached substantial depth. The waste enters the recess when the recess is adjacent the grind wheel and is discharged from the recess either gravitationally or centrifugally when the recess is remote from the wheel.

In one form of the invention (Fig. 4) the recesses 31 are in the sides of the crusher disc 10, are arcuate with both ends interrupting the crushing surface, and the recesses on opposite sides of the crusher are circumferentially alternately arranged. In another form of the invention (Fig. 5) the recesses 32 are radial and extend across the entire width of the crusher disc 10a. In both cases the recesses interrupt a relatively small portion of the crushing surface.

A complete grind wheel 27a is shown in use in Fig. 3 with the lands 29 grinding grooves in a workpiece 33. Both the lands 29 and grooves 28 in the grind wheel may be used to grind various regions of the workpiece to proper diameters.

After the crushing operation is complete the tool may be removed from the grinder and then disassembled by removing the nut 15, washer 18, crushers 10 and spacers 14 from the arbor 13. To form a grind wheel of a different shape, another combination of crushers and spacers is mounted on the arbor and the process is repeated. Thus an arbor and an inventory of crushers and spacers makes it unnecessary to manufacture a single special tool for each shape of grind wheel required.

I claim:

1. A crushing element for shaping a grinding wheel comprising, a generally circular disk-shaped body, said body being adapted to be mounted on an arbor, said body having a peripheral portion defining a generally smooth crushing surface adapted to be crushingly engaged against a grinding wheel, said body having in both sides a plurality of arcuate recesses, each recess intersecting the crushing surface of said element at two circumferentially spaced locations, whereby to remove waste formed during the shaping of a grinding wheel, the recesses on opposite sides of said crushing element being circumferentially alternately arranged, said recesses interrupting a relatively small portion of the area of said crushing surface.

2. In combination, a plurality of crushing elements of the type defined in claim 1, arbor means supporting said crushing elements in substantially co-axial relation and means operative to secure said crushing elements at predetermined positions along the length of said arbor means with at least portions of each of said recesses in adjacent crushing elements being exposed for disposing of waste formed during the shaping of a grinding wheel.

3. A crushing element for shaping a grinding wheel comprising, a generally circular disk-shaped body, said body being adapted to be mounted on an arbor, said body having a peripheral portion defining a generally smooth crushing surface adapted to be crushingly engaged against a grinding wheel, said body having in both sides a plurality of circumferentially spaced slots, each slot extending for its entire axial length into a side surface of the crusher, said slots having side walls substantially uniformly spaced from each other so that the slot has a substantially uniform cross section, each end of said slots being open to the crushing surface to form a duct for disposing of waste material formed during the shaping of a grinding wheel with recesses on opposite sides of the crushing element being circumferentially arranged to interrupt a relatively small portion of the area of the crushing surface.

4. In combination, a plurality of crushing elements of the type defined in claim 3, arbor means supporting said crushing elements in substantially co-axial relation and means operative to secure said crushing elements at predetermined positions along the length of said arbor means with at least portions of each of said recesses in adjacent crushing elements being exposed for disposing of waste formed during the shaping of a grinding wheel.

5. A tool for shaping a grinding wheel comprising, a plurality of crushing elements, each element comprising, a generally circular disk-shaped body, said body being adapted to be mounted on an arbor, said body having a peripheral portion defining a generally smooth crushing surface adapted to be crushingly engaged against a grinding wheel, said body having a plurality of circumferentially spaced slots having an opening at the crushing surface which extends through the entire width thereof, each slot having side walls which are substantially uniformly spaced and which are substantially parallel to each other and to the axis of the body so that the slot has substantially the same width throughout its depth, each slot having a radial dimension greater than its circumferential dimension, said slots opening also at the side faces of the crusher element to form a duct for disposing of waste material formed during the shaping of a grinding wheel, the openings of said slots interrupting generally a small fraction of the total area of the crushing surface, arbor means supporting said crushing elements in substantially co-axial relation and means operative to secure said crushing elements at predetermined positions along the length of said arbor means with at least portions of each of said recesses in adjacent crushing elements being exposed for disposing of waste formed during the shaping of a grinding wheel.

References Cited in the file of this patent

UNITED STATES PATENTS

| | | |
|---|---|---|
| 118,705 | Fagin | Sept. 5, 1871 |
| 229,250 | Hammond | June 29, 1880 |
| 501,194 | Sperry | July 11, 1893 |
| 875,935 | Landis | Jan. 7, 1908 |
| 927,164 | Puffer | July 6, 1909 |
| 983,379 | Lentz | Feb. 7, 1911 |
| 1,355,142 | Hanson | Oct. 12, 1920 |
| 1,689,930 | Place | Oct. 30, 1928 |
| 1,736,355 | Mosher | Nov. 19, 1929 |
| 2,279,523 | Rickenmann | Apr. 14, 1942 |
| 2,283,481 | Womble | May 9, 1942 |
| 2,495,492 | Wilson | Jan. 24, 1950 |
| 2,663,137 | Asbury | Dec. 22, 1953 |

FOREIGN PATENTS

| | | |
|---|---|---|
| 150,500 | Great Britain | Sept. 9, 1920 |
| 605,146 | Great Britain | July 16, 1948 |

OTHER REFERENCES

Ser. No. 420,312, Fouquet (A. P. C.), published June 15, 1943.